Aug. 10, 1954     P. P. ANDERSON, JR     2,685,782
TWO-PRESSURE ABSORPTION REFRIGERATION SYSTEM
Filed July 12, 1951
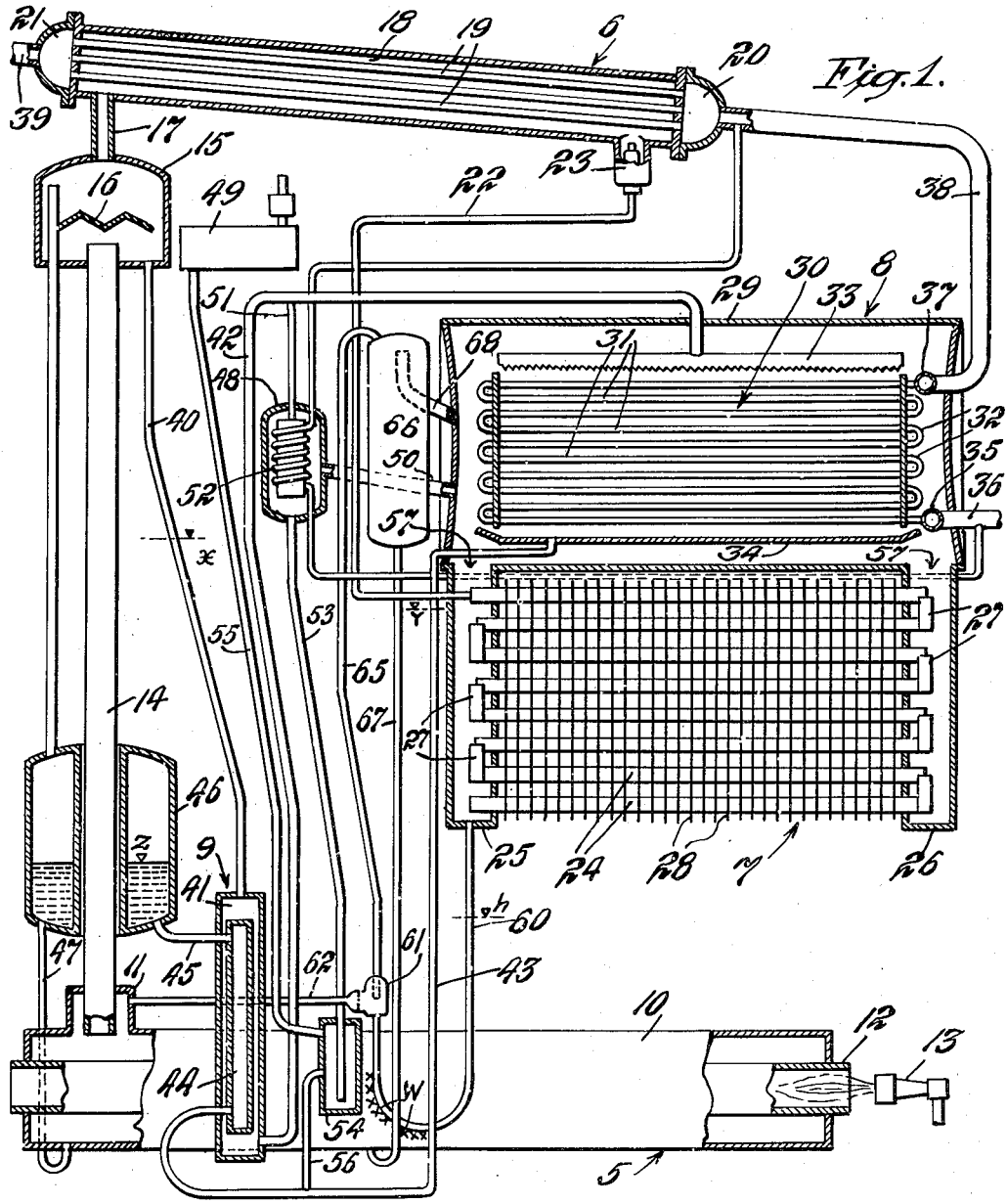
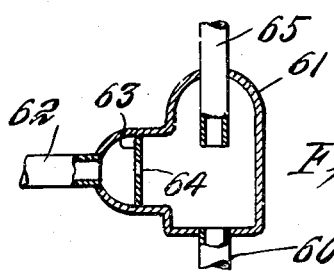
INVENTOR.
PHILIP P. ANDERSON, JR.
BY Oliver S. Titcomb
his ATTORNEY Patented Aug. 10, 1954

2,685,782

UNITED STATES PATENT OFFICE 2,685,782

TWO-PRESSURE ABSORPTION REFRIGERATION SYSTEM

Philip P. Anderson, Jr., Evansville, Ind., assignor to Servel, Inc., New York, N. Y., a corporation of Delaware Application July 12, 1951, Serial No. 236,429

8 Claims. (Cl. 62—119)

The present invention relates to refrigeration and more particularly to a construction and arrangement of elements in a columnar type two pressure absorption refrigeration system in which the difference in pressure is maintained by liquid columns.

Vacuum absorption refrigeration systems using water as a refrigerant and a salt solution as an absorbent have been used extensively for air conditioning. In such systems absorbent is raised by a vapor liquid-lift for gravity flow through the absorption solution circuit and the absorber is located above the liquid level in the circuit to maintain pressure balancing liquid columns between the absorber and generator. The evaporator is located above the absorber so that any liquid therein may drain into a concentration control vessel also connected in a pressure balancing liquid column.

It has heretofore been proposed to locate the evaporator below the absorber and provide an auxiliary vapor liquid-lift to raise liquid from the bottom of the evaporator to a higher level for flow to the absorption solution circuit. In such installations the steam condensate from the main lift is used to heat the auxiliary lift. Such condensate supplies sufficient heat to lift small quantities of liquid refrigerant overflowing from the evaporator but its temperature is too low to expel enough vapor from absorption solution to raise solution entering the evaporator during transit. Therefore, if any appreciable amount of liquid absorbent is trapped in the evaporator it interferes with the proper operation of the system for a comparatively long period of time.

One of the objects of the present invention is to provide a columnar type two pressure absorption refrigeration system with the evaporator located below the absorber and a drain conduit connected between the bottom of the evaporator and a vapor chamber in the absorption solution circuit which permits the flow of liquid between periods of operation and limits the flow of refrigerant vapor during periods of operation.

Another object is to provide an auxiliary vapor liquid-lift connected to receive vapor from the generator and liquid from the bottom of the evaporator and adapted to lift the liquid to a level for flow through a pressure balancing liquid column to the absorption solution circuit.

Still another object of the invention is to provide a two pressure vacuum type absorption refrigeration system with a drain conduit between the bottom of the evaporator and absorption solution circuit and an auxiliary vapor liquid-lift in the drain conduit for lifting unevaporated liquid refrigerant from the evaporator into a concentration control vessel connected to the absorption solution circuit in a pressure balancing liquid column.

These and other objects will become more apparent from the following description and drawings in which like reference characters denote like parts throughout the several views. It is to be expressly understood, however, that the drawings are for the purpose of illustration only and not a definition of the limitation of the invention, reference being had for this purpose to the appended claims. In the drawing:

Fig. 1 is a diagrammatic view of a two pressure vacuum type absorption system with the evaporator located below the absorber and showing the drain conduit connected between the evaporator and generator and auxiliary vapor liquid-lift in the drain conduit;

Fig. 2 is an enlarged view of the lift chamber of the auxiliary vapor liquid-lift and showing the orifice for limiting the flow of vapor from the generator.

Referring to the drawings, a two pressure vacuum type absorption refrigeration system is illustrated comprising a generator 5, a condenser 6, an evaporator 7, an absorber 8 and a liquid heat exchanger 9 interconnected for the circulation of refrigerant and absorbent. The system is hermetically sealed, evacuated of all air or other gases and contains a water solution of a salt such as lithium bromide. Water, constituting the refrigerant, is expelled from solution by the application of heat and the concentrated salt solution from which the water has been expelled constitutes the absorbent.

The generator 5 may take other forms and as illustrated in the drawing is generally similar to that illustrated and described in the United States application for Letters Patent of Norton E. Berry, Serial No. 164,059, filed May 25, 1950, now Patent No. 2,625,800, dated Jan. 20, 1953. Suffice it to state herein that the generator 5 comprises a horizontally arranged cylindrical vessel 10 closed at both ends and having a vapor dome or chamber 11 located at the top thereof preferably at one end. A flue 12 extends axially of the generator vessel 10 through which the products of combustion from a gas burner 13 or the like flow to heat the solution. The lower end of a vertical vapor liquid-lift tube 14 projects into the vapor chamber 11 and a separating chamber 15 surrounds and encloses the upper end of the lift conduit. Baffles 16 in the separating chamber 15 separate the refrigerant vapor from solution issuing from the upper end of the lift conduit.

A vapor pipe 17 connects the separating chamber 15 to condenser 6. Condenser 6 comprises a shell forming a chamber 18 with tubes 19 extending therethrough between headers 20 and 21. Liquid refrigerant condensed in condenser 6 flows to the evaporator 7 through a conduit 22. A device 23 in conduit 22 has an orifice therein for permitting the flow of liquid refrigerant and non-condensable gases while maintaining the difference in pressure between the condenser and evaporator as illustrated and described in an application for United States Letters Patent of Norton E. Berry Serial No. 725,000, filed January 29, 1947, now Patent No. 2,563,575, dated Aug. 7, 1951.

The evaporator 7 comprises a series of tubes 24 arranged one over the other with their ends extending into spaced headers 25 and 26. Cups 27 mounted at the ends of alternate tubes of each row in the respective headers 25 and 26 underlie the end of the next uppermost tube so that refrigerant flows by gravity through successive tubes from the top to the bottom of the evaporator. Headers 25 and 26 are connected to deliver refrigerant vapor from the evaporator tubes 24 to the absorber 8. Heat transfer fins 28 are arranged in spaced relation on the evaporator tubes 24 and air to be cooled flows over the tubes and between the fins.

The absorber 8 comprises a shell 29 enclosing a serpentine coil or series of coils 30 arranged in parallel. Each coil 30 comprises a plurality of straight tube sections 31 arranged one over the other in a vertical plane with the ends of the alternate tubes connected by elbows 32 to provide a continuous serpentine coil. Overlying the serpentine coil 30 or plurality of such coils is a liquid distributor 33 for delivering absorption solution weak in refrigerant onto the uppermost horizontal tube section 31 of each coil which drips from each coil section to the next lowermost coil section from the top to the bottom of the absorber. Underlying the coils 30 is a tray 34 for collecting absorption solution dripping from the coils. The lower or inlet ends of coil 30 are connected by a header 35 and the header, in turn, is connected by a conduit 36 to a supply of cooling water such as a city main or cooling tower. The upper or outlet ends of the coils 30 are connected by a header 37 which, in turn, is connected by a conduit 38 to the header 20 of condenser 6. Thus cooling water flows through the absorber coils 30 and tubes 19 of the condenser, successively, and the cooling water is discharged from the outlet header 21 of condenser 6 through discharge conduit 39.

Absorption solution weak in refrigerant is delivered from the separating chamber 15 to the liquid distributor 33 in absorber 8 through a path of flow comprising the conduit 40, outer passage 41 of the liquid heat exchanger 9 and conduit 42. Absorption solution strong in refrigerant flows from the tray 34 at the bottom of the absorber 8 to the generator 5 in a path of flow comprising conduit 43, inner passage 44 of liquid heat exchanger 9, conduit 45, leveling vessel 46, and conduit 47. Thus, the absorption solution circuit comprises the generator 5, vapor liquid-lift 14, and absorber 8 so connected and arranged that absorption solution raised by the vapor liquid-lift flows by gravity back to the generator. The leveling vessel 46 is adapted to receive the absorption solution flowing from the absorber 8 and has a relatively large cross-sectional area so that variations in the amount of absorbent delivered thereto will not materially affect the liquid level to maintain a substantially constant hydrostatic reaction head on the vapor liquid-lift 14. The absorber 8 is located above the liquid level in the leveling vessel 46 is the absorption solution circuit to maintain pressure balancing hydrostatic columns of solution in conduits 42 and 43 of a height to balance the difference in pressures in the absorber 8 and generator 5. During operation of the system solution will stand at some level $x$ in conduit 40 connected to conduit 42 through the liquid heat exchanger 9, at a level $y$ in conduit 43, and at a level $z$ in the leveling chamber 46.

A purging device 48 is provided for continually withdrawing non-condensable gases from the system and transferring them to a storage vessel 49. The purge device 48 comprises an auxiliary absorber vessel connected to the main absorber 8 through a suction tube 50 for producing a relative vacuum therein and is generally similar to the purge device described and claimed in the reissue patent to C. A. Roswell Re. 23,093 issued March 22, 1949. The purge device 48 has a connection 51 to conduit 42 for supplying absorption solution weak in refrigerant, a cooling coil 52 therein connected between the conduits 36 and 38 and a fall tube 53 depending from the bottom thereof. A separating chamber 54 surrounds the lower end of the fall tube 53 and is connected by a riser 55 to the gas storage vessel 49 and by a conduit 56 to the absorption solution circuit. As thus far described, the absorption refrigeration system is substantially identical with those heretofore used for air conditioning.

In accordance with the present invention, the evaporator 7 is located below the absorber 8 and the headers 25 and 26 are connected to openings 57 in the bottom of the absorber shell 29. The bottom of the evaporator 7 is located above the lowest static liquid level existing in the absorption solution circuit in leveling chamber 46 or generator 5 between periods of operation, and means are provided to drain liquid from the evaporator to the absorption solution circuit between periods of operation and lift any unevaporated liquid refrigerant from the bottom of the evaporator into a concentration control arrangement during periods of operation.

As illustrated, the drain means comprises a depending U-shaped conduit 60 having its upper end connected to the bottom of the evaporator headers 25 and its lower end connected to the bottom of an auxiliary vapor liquid-lift chamber 61. The up leg of conduit 60 is heated, preferably by welding it to the generator shell 10 as indicated at W. The side of the auxiliary vapor liquid-lift chamber 61 is connected by a horizontal or inclined conduit 62 to the vapor dome or chamber 11 of the generator 10. The conduit 60, auxiliary lift chamber 61 and conduit 62 are so arranged as to provide a hydraulic gradient from the bottom of the evaporator header 25 to the steam chamber 11 of the generator 5 for the gravity flow of liquid therethrough and a riser for producing a hydrostatic reaction head on the auxiliary lift chamber. A septum 63 having an orifice 64 therein, see Fig. 2, is located in the vapor liquid-lift chamber 61 adjacent the conduit 62. The orifice 64 is of such size as to permit absorption solution or liquid refrigerant to flow slowly from the evaporator header 25 to the vapor chamber 11 of generator 5 between periods of operation while limiting the amount of vapor flowing from the generator to the auxiliary vapor liquid-lift chamber 61 during periods of operation.

An auxiliary vapor liquid-lift tube 65 has its lower end projecting into the dome of chamber 61 in the drain conduit and its upper end is connected to a concentration control vessel 66. The concentration control vessel 66 is generally similar to that described and claimed in United States Letters Patent to Lowell McNeely No. 2,465,904 issued March 29, 1949. The bottom of the vessel 66 is connected by a down tube 67 to the generator 5. Concentration control vessel 66 is located above the liquid level $z$ in leveling chamber 46 a distance sufficient to maintain a column of liquid refrigerant in tube 67 and the vessel of a height to balance the difference in pressure between the absorber 8 and generator 5. A vent tube 68 connects the shell 29 of absorber 8 to the interior of the concentration control vessel 66 to maintain the pressure therein the same as that in the absorber. One form of the invention having now been described in detail, the mode of operation is explained as follows.

During transportation of the apparatus from the factory where it is manufactured to the place it is to be installed, absorption solution may enter the evaporator 7 due to tipping or tilting the unit. When the unit is installed in its upright position at the location where it is to be used, such absorption solution will flow from the tubes 24 into header 25 and from the header through the drain conduit 60 into the chamber 61 of auxiliary vapor liquid-lift 65. From the chamber the liquid will flow through the orifice 64 in septum 63 and conduit 62 into the chamber 11 of the generator 5. Due to the fact that the bottom of the evaporator header 25 is located above the lowest static liquid level in the absorption solution circuit, such flow of absorption solution or other liquid is insured.

To initiate operation of the system, gas burner 13 is ignited and the products of combustion flow through the flue 12 to heat the solution in the generator 5. Heating of the solution expels refrigerant vapor therefrom which accumulates at the top of the generator and displaces liquid from the vapor chamber 11. When sufficient vapor has been generated to depress the liquid level below the end of the lift tube 14, vapor will flow upwardly through the latter and carry droplets of absorption solution into the separating chamber 15 as described in the Berry application Serial No. 164,059, now Patent No. 2,625,800, dated Jan. 20, 1953, referred to above. The cross-sectional area of the lift tube 14 is so correlated to the rate of vapor generation in the generator 5 as to cause the liquid absorbent to be lifted in the desired ratio of, for example, 14 pounds of solution for each pound of vapor generated. Vapor flows from separating chamber 15 through the vapor pipe 17 into the chamber 18 of condenser 6 where it contacts the relatively cold tubes 19 and is condensed to a liquid. The liquid refrigerant flows through the orifice device 23 and conduit 22 into one end of the uppermost tube 24 of the evaporator 7 and flows by gravity through successive tubes and cups 27 from the top to the bottom of the evaporator.

Simultaneously, absorption solution weak in refrigerant flows from the separating chamber 15 through conduit 40, outer passage 41 of heat exchanger 9 and conduit 42 to the liquid distributor 33 in absorber 8. The absorption solution is distributed onto the uppermost straight tube sections 31 of the serpentine coils 30 and drips from each tube section onto the next lowermost tube from the top to the bottom of the absorber 8. Refrigerant vapor flows from the headers 25 and 26 into the shell 29 of absorber 28 and is absorbed in the absorption solution on the serpentine coils 30. Due to the affinity of the refrigerant vapor for absorption solution the liquid refrigerant evaporates in the tubes 24 of evaporator 7 at a low vapor pressure to produce a refrigerating effect therein. Air flowing through evaporator 7 is cooled by contact with the chilled tubes 24 and fins 28 and the heat from the air is transferred through the walls of the tubes and causes the refrigerant therein to evaporate. Absorption solution strong in refrigerant flows by gravity from the tray 34 through the conduit 43, inner passage 44 of liquid heat exchanger 9, conduit 45, leveling vessel 46 and conduit 47 back to the generator 5.

During operation of the system any unevaporated liquid refrigerant overflowing from the lowermost tube 24 of evaporator 7 enters header 25 and drains into conduit 60. The liquid refrigerant in the up leg of conduit 60 is heated through the wall of the conduit welded at W to the shell 10 of the generator. Such heating should be sufficient to increase the temperature of the maximum amount of liquid refrigerant expected to overflow to its boiling point at the pressure at the lower end of the auxiliary vapor liquid-lift conduit 65. Refrigerant vapor flows continuously from the vapor chamber 11 of generator 5 through conduit 62 into the chamber 61 but the orifice 64 limits the flow of vapor. When no liquid refrigerant is overflowing from evaporator 7, such vapor can flow through the conduit 60 and header 25 of evaporator 7 into absorber 8 or through the auxiliary lift conduit 65, concentration control vessel 66 and vent pipe 68 into the absorber 8. Due to the extremely low pressure prevailing in the system, the amount of vapor flowing through the orifice 64 constitutes a negligible amount of refrigerant expelled from solution in generator 5, less than one per cent. However, when liquid refrigerant is overflowing from the lowermost tube 24 of the evaporator and accumulates in the drain tube 60 to a height $h$ sufficient to produce a reaction head, the vapor entering the chamber 61 through the orifice 64 will then operate to lift the liquid refrigerant through the auxiliary vapor liquid lift 65 into the concentration control vessel 66. The introduction of vapor into the heated liquid refrigerant also agitates the liquid to initiate boiling of superheated liquid which prevents liquid from backing up into header 25 of evaporator 7.

Liquid refrigerant introduced into the concentration control vessel 66 will displace any other liquid therein and be stored in a liquid column of a height to balance the difference in pressure between the absorber 8 and generator 5. Such storage of liquid refrigerant out of the absorption solution circuit increases the concentration of the adsorption solution which, in turn, reduces the vapor pressure and temperature in the evaporator 7 to increase the rate of evaporation therein. The storage of liquid refrigerant in the concentration control vessel 66 continues until all of the refrigerant supplied to the evaporator 7 is evaporated therein. Such a concentration control operates advantageously to compensate for changes in operating conditions such as the cooling water temperature. At high cooling water temperatures the difference in pressure between the high and low pressure sides of the system increases to increase the height of the pressure balancing liquid column and the amount of refrigerant stored in the concentration control vessel 66 and at low cooling water temperatures the difference in pressure decreases to decrease the height of the liquid column and amount of refrigerant stored. Between periods of operation any absorption solution or liquid refrigerant will drain from the evaporator 7 to the generator 5 in the manner previously explained.

It will now be observed that the present invention provides a two pressure columnar type absorption refrigeration system in which the evaporator is located below the absorber with means for draining liquid from the evaporator to the absorption solution circuit. It will also be observed that the present invention provides a novel construction and arrangement of elements for draining liquid from the evaporator to the generator between periods of operation and lifting liquid refrigerant to a higher level for flow through a pressure balancing liquid column to the absorption solution circuit during periods of operation. It will still further be observed that the present invention provides a connection between the evaporator and generator for draining liquid between periods of operation and lifting liquid refrigerant overflowing from the evaporator into a concentration control vessel during periods of operation where it is stored in a pressure balancing liquid column.

While a single embodiment of the invention is herein illustrated and described, it will be understood that modifications may be made in the construction and arrangement of elements without departing from the spirit or scope of the invention. Therefore, without limitation in this respect, the invention is defined by the following claims.

I claim:

1. In a two pressure absorption refrigeration system, an absorption solution circuit having a generator, a vapor liquid-lift utilizing expelled vapor for lifting absorption solution for gravity flow through the circuit and an absorber so connected in the circuit above the liquid level therein as to maintain pressure balancing liquid columns, an evaporator underlying the absorber and utilizing the lateral space of the absorber and the vertical space required for the pressure balancing liquid columns, said evaporator being connected to deliver refrigerant vapor to the absorber, the bottom of the evaporator being located above the lowest static liquid level in the absorption solution circuit, a vapor chamber in the solution circuit below said evaporator and a drain conduit connected between the bottom of the evaporator and vapor chamber in the solution circuit, said drain conduit having a construction to pass only a negligible quantity of vapor therethrough.

2. In a two pressure vacuum type absorption refrigeration system utilizing water as a refrigerant and a salt solution as an absorbent, an absorption solution circuit having a generator with a vapor chamber, a vapor liquid-lift utilizing expelled vapor from said vapor chamber for lifting absorption solution for gravity flow through the circuit and an absorber so connected in the circuit above the liquid level therein as to maintain pressure balancing liquid columns, an evaporator below the absorber and connected to deliver refrigerant vapor to the latter, the bottom of the evaporator being located above the lowest static liquid level in the absorption solution circuit, said vapor chamber of the generator being located below said lowest static liquid level in the absorption solution circuit, a drain conduit between the bottom of the evaporator and vapor chamber of the generator, and an orifice in the drain conduit which permits liquid to flow from the evaporator to the generator between periods of operation and passes only a negligible quantity of vapor during periods of operation.

3. In a two pressure absorption refrigeration system, an absorption solution circuit having a generator, a vapor liquid-lift utilizing expelled vapor for lifting absorption solution for gravity flow through the circuit and an absorber so connected in the circuit above the liquid level therein as to maintain pressure balancing liquid columns, an evaporator below the absorber and connected to deliver refrigerant vapor to the latter, an auxiliary vapor liquid-lift connected to the bottom of the evaporator and the generator to receive liquid from the evaporator and vapor from the generator, and the outlet from the auxiliary vapor liquid-lift being so connected to the absorption solution circuit as to maintain a pressure balancing liquid column between the auxiliary lift and generator.

4. In a two pressure vacuum type absorption refrigeration system utilizing water as a refrigerant and a salt solution as an absorbent, an absorption solution circuit having a generator for expelling vapor and a space for expelled vapor below the liquid level therein, a vapor liquid-lift utilizing expelled vapor for lifting absorption solution for gravity flow through the circuit and an absorber so connected in the circuit above the liquid level therein as to maintain pressure balancing liquid columns, an evaporator below the absorber and connected to deliver refrigerant vapor to the latter, a drain conduit connected between the bottom of the evaporator and the vapor space in the solution circuit, an auxiliary vapor liquid-lift projecting upwardly from the drain conduit and connected to receive liquid from the evaporator and vapor from the vapor space, and conduit means connecting the outlet from the auxiliary vapor liquid-lift to the absorption solution circuit and arranged to maintain a pressure balancing liquid column.

5. In a two pressure absorption refrigeration system, an absorption solution circuit comprising a generator having a vapor space for expelled vapor during operation of the system, a vapor liquid-lift utilizing expelled vapor for lifting absorption solution for gravity flow through the circuit and an absorber so connected in the circuit above the liquid level therein as to maintain pressure balancing liquid columns, an evaporator below the absorber and above the vapor space in the generator and connected to deliver refrigerant vapor to the absorber, a drain conduit connected between the bottom of the evaporator and vapor space of the generator, an auxiliary vapor liquid-lift connected to the drain conduit to receive liquid from the evaporator and vapor from the generator, means for heating the liquid in the drain conduit as it flows toward the auxiliary vapor liquid-lift, and the outlet from the auxiliary vapor liquid-lift being so connected to the absorption solution circuit as to maintain a pressure balancing liquid column between the auxiliary lift and generator.

6. In a two pressure vacuum type absorption refrigeration system utilizing water as a refrigerant and a salt solution as an absorbent, an absorption solution circuit comprising a generator having a space for vapor during operation of the system, a vapor liquid-lift utilizing expelled vapor for lifting absorption solution for gravity flow through the circuit and an absorber so connected in the circuit above the liquid level therein as to maintain pressure balancing liquid columns, an evaporator below the absorber and connected to deliver refrigerant vapor to the latter, an auxiliary lift chamber below the bottom of the evaporator, a drain conduit depending from the bottom of the evaporator and connected to the auxiliary lift chamber, a conduit connecting the auxiliary lift chamber to the vapor space of the generator, and conduit means connecting the outlet from the auxiliary vapor liquid-lift to the absorption solution circuit and arranged to maintain a pressure balancing liquid column.

7. In a two pressure absorption refrigeration system, an absorption solution circuit having a generator with a vapor space, a vapor liquid-lift and an absorber so connected in the circuit as to maintain pressure balancing liquid columns between the generator and absorber, an evaporator below the absorber and connected to deliver refrigerant vapor to the latter, a concentration control vessel connected to the absorption solution circuit and located at a level to maintain a pressure balancing liquid column therein, a drain conduit between the bottom of the evaporator and vapor space of the generator, and an auxiliary vapor liquid-lift having its lower end connected in the drain conduit to receive vapor from the generator and liquid from the bottom of the evaporator and its upper end connected to the concentration control vessel.

8. In a two pressure vacuum type absorption refrigeration system utilizing water as a refrigerant and a salt solution as an absorbent, an absorption solution circuit having a generator with a vapor chamber, a vapor liquid-lift utilizing expelled vapor for lifting absorption solution for gravity flow through the circuit and an absorber so connected in the circuit above the liquid-lift therein as to maintain pressure balancing liquid columns, an evaporator below the absorber and connected to deliver refrigerant vapor to the latter, a concentration control vessel above the evaporator, a drain conduit connected between the bottom of the evaporator and vapor chamber of the generator, an orifice in the drain conduit to limit the vapor flow from the generator, an auxiliary vapor liquid lift in the drain conduit utilizing vapor flowing through the orifice from the generator to lift liquid refrigerant draining from the bottom of the evaporator into the concentration control vessel, and conduit means connecting the concentration control vessel and absorption solution circuit to maintain a pressure balancing liquid column therein.

References Cited in the file of this patent

UNITED STATES PATENTS

| Number | Name | Date |
|---|---|---|
| 2,282,503 | Thomas | May 12, 1942 |
| 2,337,439 | Anderson | Dec. 21, 1943 |
| 2,353,859 | Thomas | July 18, 1944 |
| 2,465,904 | McNeely | Mar. 29, 1949 |